United States Patent [19]

Shimizu et al.

[11] Patent Number: 5,753,174
[45] Date of Patent: May 19, 1998

[54] HOLLOW STRUCTURAL MEMBER AND METHOD OF MANUFACTURE

[75] Inventors: Kaoru Shimizu, Osaka; Kazuhiko Kodama, Kyoto, both of Japan

[73] Assignee: Matsushita Electric Industrial Co., Ltd., Osaka, Japan

[21] Appl. No.: 533,556

[22] Filed: Sep. 25, 1995

[30] Foreign Application Priority Data

Sep. 28, 1994 [JP] Japan .................. 6-232885
Feb. 8, 1995 [JP] Japan .................. 7-020386

[51] Int. Cl.⁶ .................................................. B29C 45/16
[52] U.S. Cl. ..................................... 264/513; 264/572
[58] Field of Search ................... 264/513, 512, 264/572

[56] References Cited

U.S. PATENT DOCUMENTS

| | | | |
|---|---|---|---|
| 3,312,762 | 4/1967 | Wechsler et al. | |
| 4,617,077 | 10/1986 | Giese et al. | |
| 5,093,053 | 3/1992 | Eckardt et al. | 264/572 |
| 5,472,746 | 12/1995 | Miyajima et al. | 427/468 |

FOREIGN PATENT DOCUMENTS

| | | |
|---|---|---|
| 4202306 | 8/1992 | Germany . |
| 4240017 | 6/1994 | Germany . |
| 58-134721 | 8/1983 | Japan . |
| 61-24306 | 2/1986 | Japan . |
| 61-197221 | 9/1986 | Japan . |
| 3-196697 | 8/1991 | Japan . |
| 3-258516 | 11/1991 | Japan . |
| 5-8287 | 1/1993 | Japan . |
| 52-20777 | 8/1993 | Japan . |
| 5-259682 | 10/1993 | Japan . |
| 5-318562 | 12/1993 | Japan . |
| 2218937 | 11/1989 | United Kingdom . |

OTHER PUBLICATIONS

Tamada et al., Kokai 06-204,678, Patent Abstracts of Japan, Jul. 1994.
N. Shinbun, "Foil Formed from Liquid Material", Samco Develops New System, news item, Jun. 17, 1995 (with English translation).

*Primary Examiner*—Catherine Timm
*Attorney, Agent, or Firm*—Ratner & Prestia

[57] ABSTRACT

A method of manufacturing a functional hollow structural member having a structural member having a hollow part, and functional means disposed on the inside surface of the hollow part, comprising the steps of injecting a molding material into a molding die, injecting a gas and a functional substance into the molding material to form a hollow part in the molding material, forming functional means inside of the hollow part, and forming a structural member by solidifying the molding material. As the functional means, a layer having a magnetic function, conductive function, or antibacterial function is used.

38 Claims, 18 Drawing Sheets

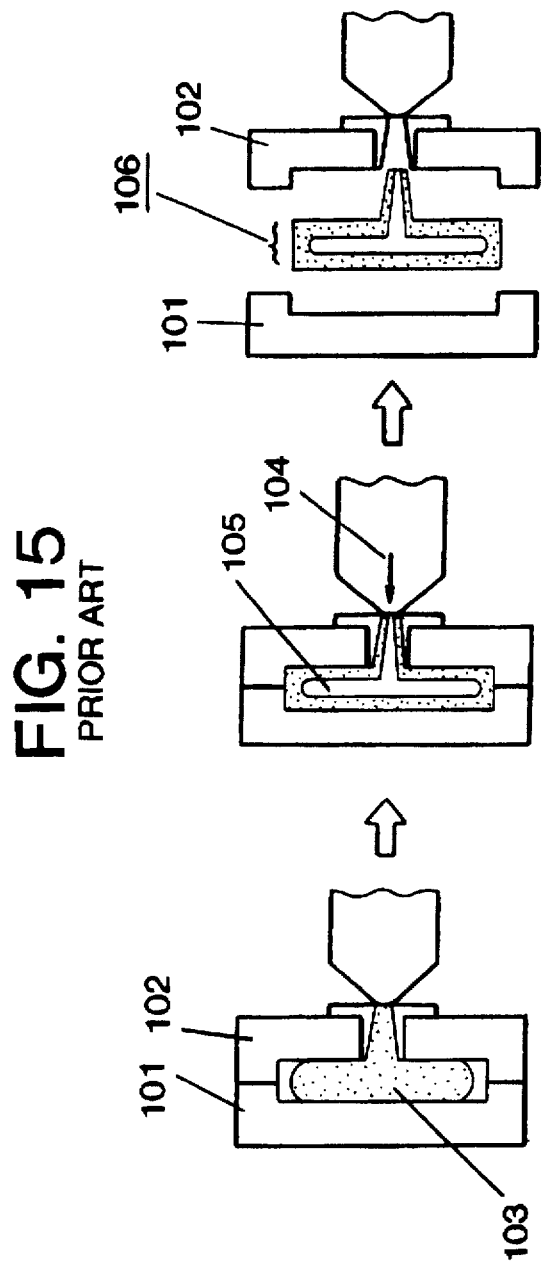

1

HOLLOW STRUCTURAL MEMBER AND METHOD OF MANUFACTURE

BACKGROUND OF THE INVENTION

1. Field of the Invention

The present invention relates to a hollow structural member used in a fixed table for mounting a television receiver (TV hereinafter), and a casing for an electronic component, electronic appliance, or the like.

2. Prior Art

Hollow structural members having a plurality of independent hollow parts or communicating hollow parts have been used as the structural members for a fixed table for mounting a TV or for use as a casing for an electronic appliance.

Such hollow structural members are made of plastics, and are manufactured by gas-assisted injection molding used for molding hollow parts by gas. Use of gas-assisted molding results in saving of molding costs, reduction of weight of molded products, improvement of quality, and molding at low pressure. FIG. 15 shows in schematic form a processing sequence for manufacturing a conventional hollow structural member. In FIG. 15, molten plastic 103 is poured in between a first die 101 and a second die 102. By injecting gas 104 into the molten plastic 103, a hollow part 105 is formed. Then it is solidified by cooling. The solidified hollow structural member 106 is taken out from the first die 101 and second die 102.

To manufacture structural members having conductive layers, the following methods are known.

(a) Applying a conductive paint on an outer surface of a solid box or a hollow structural member.

(b) Forming a thin conductive metal film by vapor deposition, plating or sputtering, on an outer surface of a solid box or a hollow structural member.

(c) Adhering a thin conductive metal plate, on an outer surface of a solid box or a hollow structural member.

(d) Forming a conductive structural member, by injection molding a starting material formed of compound plastics containing a conductive filler.

(e) Injection molding a hollow structural member, injecting a liquid conductive substance into the hollow part of a solidified structural member, and drying the liquid substance, thereby depositing a conductive layer.

In methods (a) to (c), it is hard to obtain a structural member having a complicated shape, and therefore they cannot be flexibly applied to varied designs of the casing for holding electronic appliances. Besides, these methods required many steps, making it impossible to lower the manufacturing cost.

In method (d), because the resin flowability is poor, the molding performance and surface condition of the molded product are poor.

A manufacturing process chart for method (e) is shown in FIG. 16.

(1) Molten resin is injected into the die.

(2) Gas is injected before the molten resin is solidified, and a hollow part is formed.

(3) Molten resin forming a hollow part is allowed to solidify.

(4) A conductive liquid paint is injected into the solidified hollow part.

(5) Conductive liquid paint is cured by heating.

(6) The solidified hollow part with the conductive resin painted surface is taken out of the die.

In method (e), after the molten resin injected into the die is cooled and solidified, a conductive liquid is poured into the hollow part. The time required for drying the liquid injected into the hollow part is in addition to the time for solidifying the resin poured into the die. Therefore, the molding cycle is long, and the productivity is poor.

It is hence an objective of the invention to have a manufacturing method capable of producing a hollow structural molded product having excellent surface properties and a superior appearance, the process having a shortened molding cycle at the same time for ease in manufacturing at low cost.

SUMMARY OF INVENTION

A method of manufacturing method a hollow structural member comprising the steps of:

(1) pouring a molding material into a die, (2) injecting gas into the material to form a hollow portion (part) in the material, (3) injecting a substance having a function into the hollow portion (part) of the material to form functional means inside the hollow part, (4) solidifying the material having the hollow part to form a structural member, and (5) removing the solidified structural member containing the functional means formed inside of the hollow part from the die.

Another manufacturing method for making a hollow structural member of the invention comprises the steps of:

(1) pouring a molding material into a die, (2) injecting gas into the material to form a plurality of hollow parts in the material, (3) injecting a substance having a function into the plurality of hollow parts of the material to form functional means inside the hollow parts, (4) solidifying the material having the hollow parts to form a structural member, and (5) removing the solidified structural member containing the functional means formed inside of the hollow parts from the die.

In the manufacturing method, the materials used for the structural member are not particularly defined, however thermoplastic plastic, thermosetting plastic, rubber, inorganic materials, ceramics, compound plastic containing filler, and other structural materials may be used.

The molding material is a starting material of the structural member. For example, in the case of thermoplastic plastic, the material is brought to the molten state by heating. In the case of thermosetting plastic, the material is in fluid state. In the case of inorganic matter or ceramics, the material is a mixture of powder of inorganic substance and solvent. In the case of a compound plastic containing filler, the material is in fluid state.

Gas is injected into the material before the material is solidified.

The substance having a function is injected into the material before the material is solidified. For the substance having a function, magnetic substances, conductive substances, antibacterial substances or the like may be used.

The timing of injecting of the substance having a function into the material is not particularly defined. For example, the substance having a function can be injected together with a gas as a mixture. Or the substance having a function can be injected together with gas from different nozzles. Or the substance having a function is injected before or after injection of gas into the molded hollow portion.

The shape of the of hollow parts is not particularly defined, but forms such as x-shape and + shape, V form, tee form, concentric form, radial form, cruciform and other forms isolated from one another by partition walls or the like are preferred.

Another manufacturing method for a hollow structural member comprises the steps of:

(1) forming a first structural member having a first half forming a portion of a hollow part, by using a first die having a first fixed die and a first movable die, (2) forming a second structural member having a second half forming a portion of the hollow part, by using a second die having a second fixed die and a second movable die, (3) forming first functional means inside of the first half, (4) forming second functional means inside of the second half, (5) moving the second movable die to the first fixed die, thereby combining the first structural member having the first functional means and the second structural member having the second functional means so as to form the hollow part by the first half and second half, and forming the first structural member and second structural member into one body to as to form a third structural member, and (6) removing the third structural member containing the first functional means and second functional means formed inside of the hollow part, from the first fixed die and second fixed die.

Using this manufacturing method results in a molded product having excellent surface properties and superior appearance The molding cycle is short, and the hollow structural member having the functional performance can be manufactured easily and at low cost. In particular, excellent results are obtained when manufacturing a structural member having a plurality of hollow parts and forming functional means on the surface of each hollow part.

BRIEF DESCRIPTION OF THE DRAWINGS

FIG. 15 is a schematic flow diagram showing a conventional manufacturing method for a hollow structural member.

DESCRIPTION OF THE PREFERRED EMBODIMENT

Figure 1:
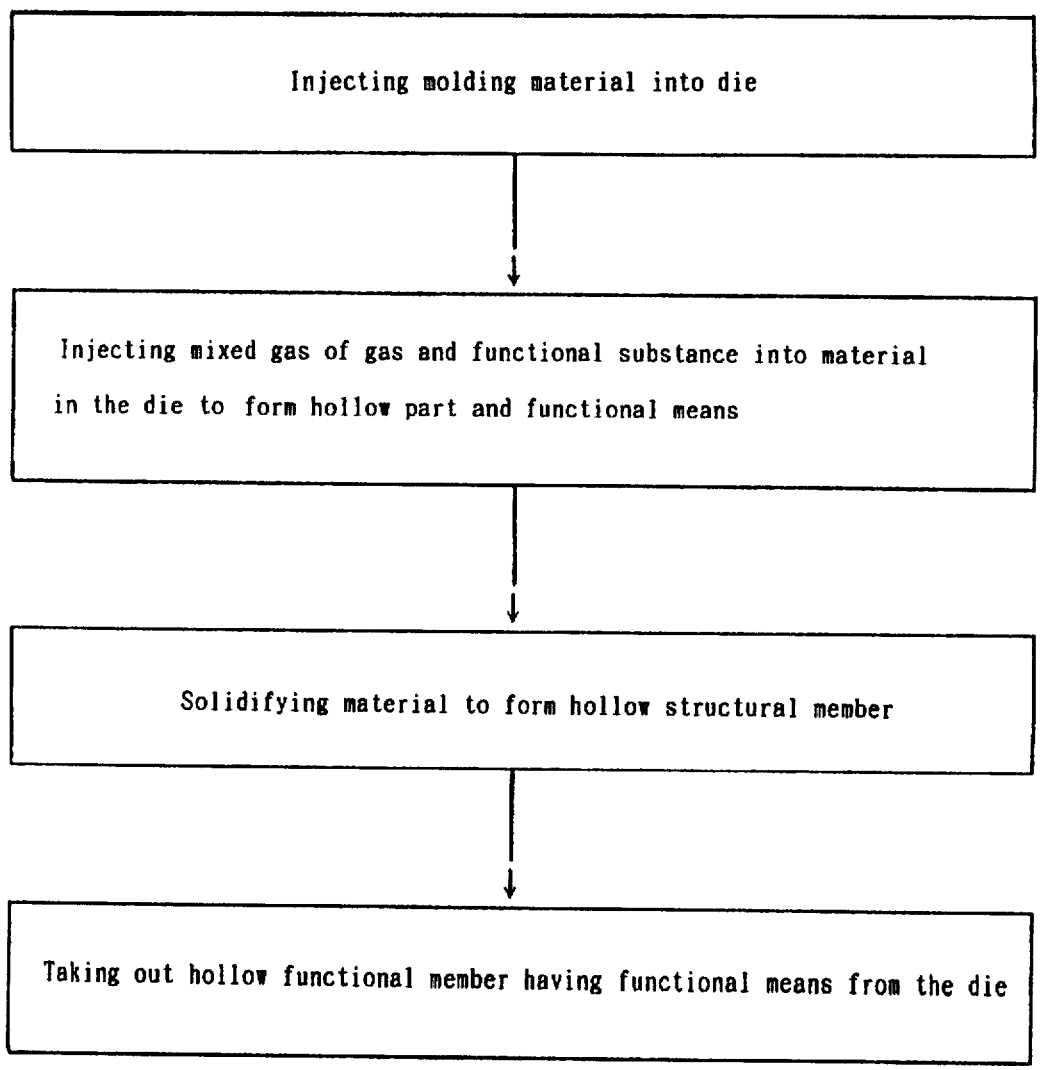
FIG. 1 is a process chart for an embodiment of a manufacturing method for a hollow structural member of the invention.

Referring now to the drawings, some of the embodiments of the invention are described in detail below.

Embodiment 1-1

FIG. 1 shows an outline of a manufacturing process for an embodiment of a manufacturing method for a hollow structural member of the invention. In FIG. 1, the method is characterized by:

(1) pouring a molding material into a cavity of a die, (2) injecting a mixture of a substance having a function and a gas before the material is solidified, thereby forming a hollow part in the material and simultaneously forming functional means on the inner surface of the hollow part, (3) solidifying the material forming the hollow part, and (4) removing the solidified structural member formed with the functional means in the hollow part, from the die.

Embodiment 1-2

Figure 2:
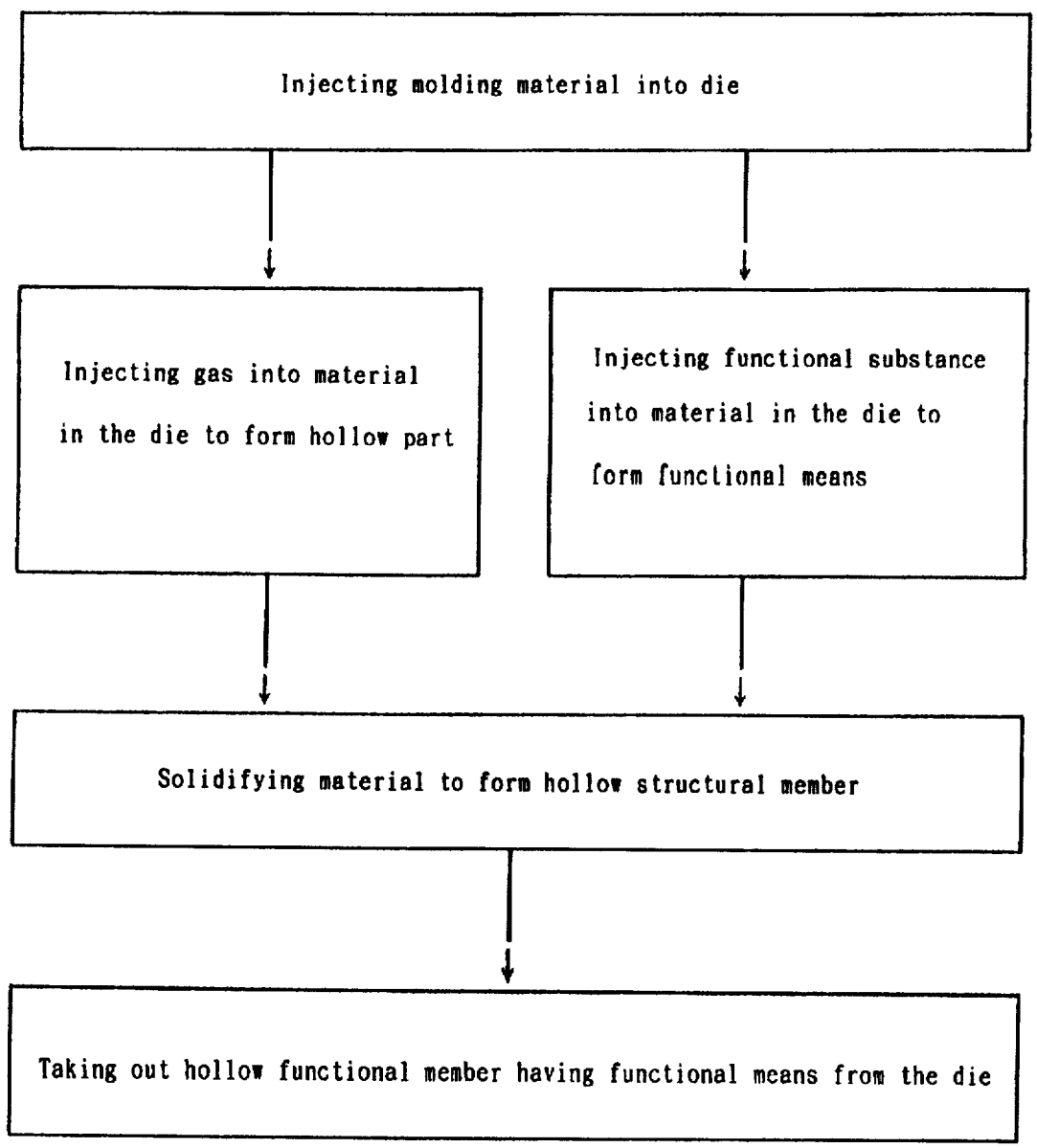
FIG. 2 is a process chart for another embodiment of a manufacturing method for a hollow structural member of the invention.

FIG. 2 shows an outline of a manufacturing process in another embodiment of a manufacturing method of hollow structural member of the invention. In FIG. 2, the method is characterized by:

(1) pouring a molding material into a cavity of a die (2) injecting a substance having a function and a gas-simultaneously and separately from different nozzles before the material is solidified into the material, thereby forming a hollow part in the material and simultaneously forming functional means on the inner surface of the hollow part, (3) solidifying the material forming the hollow part, and (4) removing the solidified structural member formed with the functional means in the hollow part, from the die.

Embodiment 1-3

Figure 3:
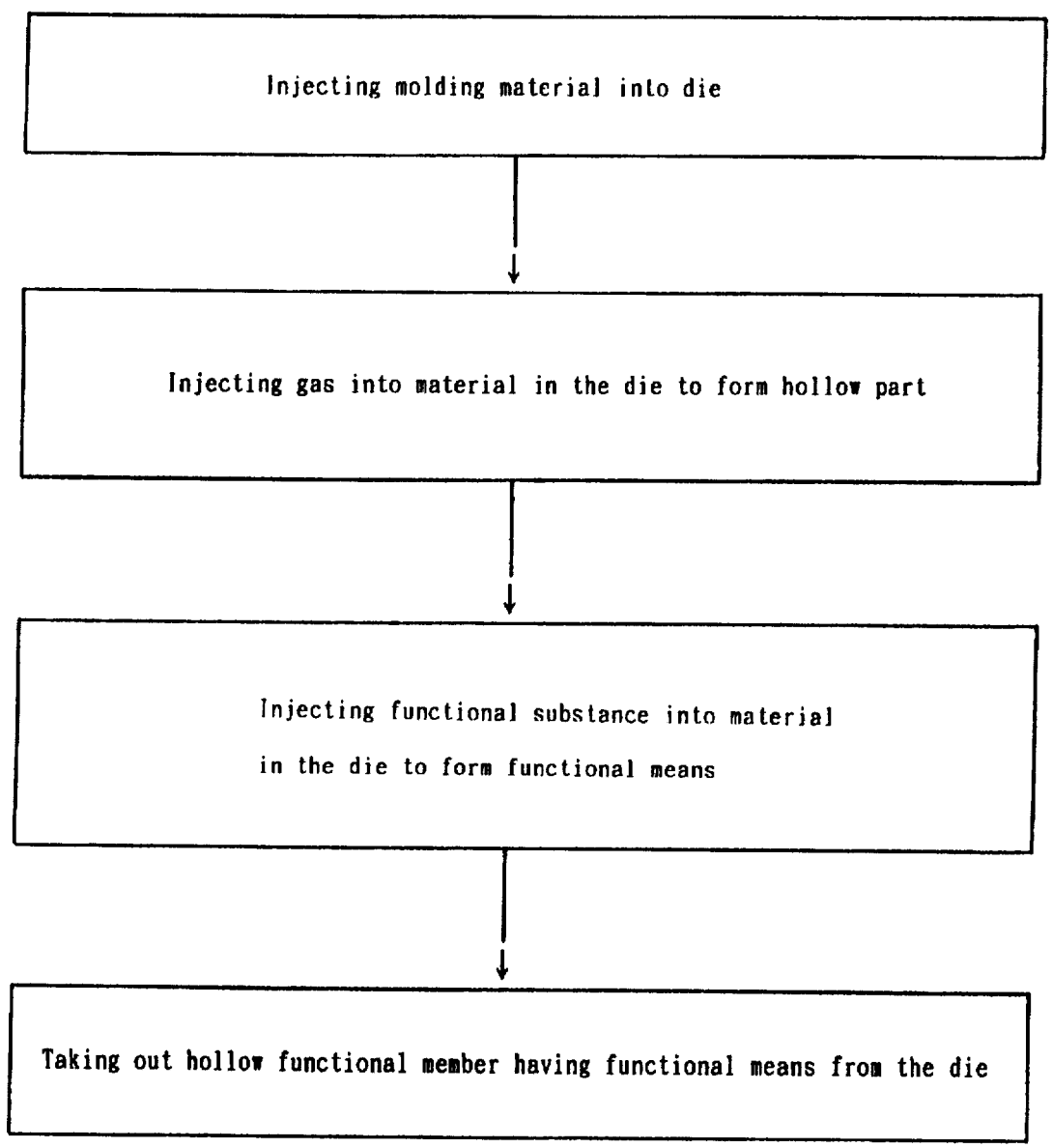
FIG. 3 is a process chart for a different embodiment of a manufacturing method for a hollow structural member of the invention.

FIG. 3 shows an outline of a manufacturing process in another embodiment of a manufacturing method of hollow structural member of the invention. In FIG. 3 the method is characterized by:

(1) pouring a molding material into a cavity of a die, (2) injecting a gas before the material is solidified, thereby forming a hollow part in the material, (3) injecting a substance having a function into the hollow part before the material is solidified, thereby forming functional means on the inner surface of the hollow part, (4) solidifying the material forming the hollow part, and (5) removing the solidified structural member formed with the functional means in the hollow part, from the die.

Embodiment 2

Figure 4:
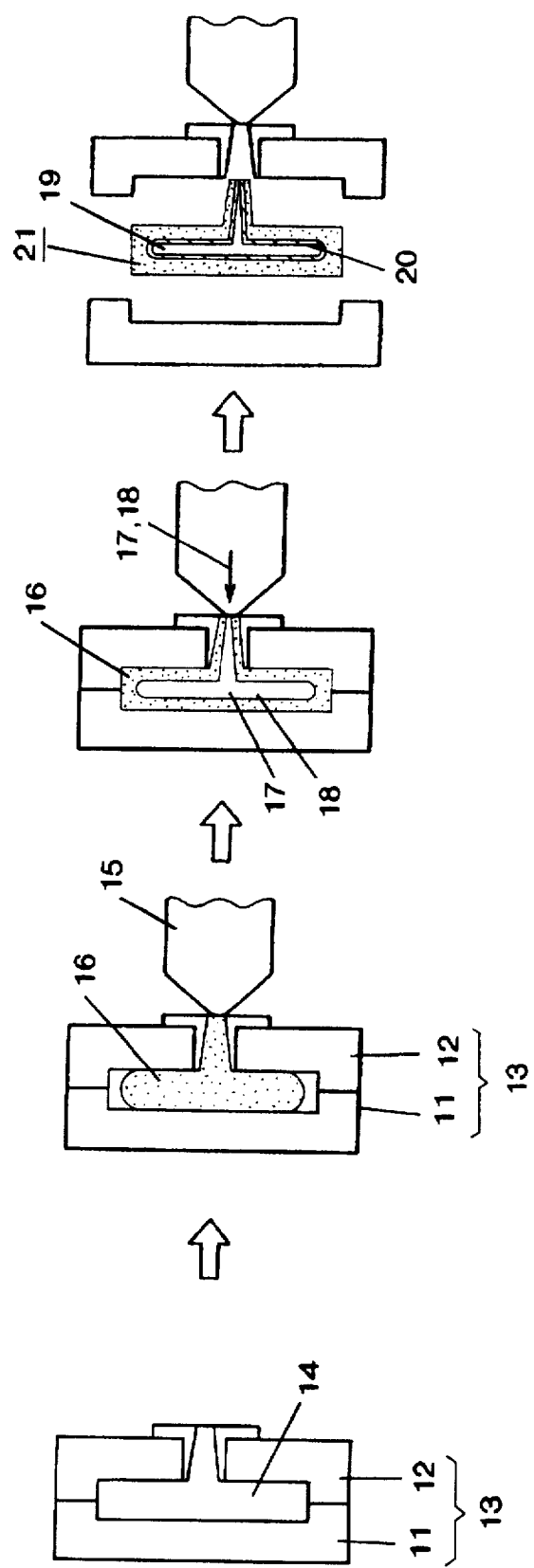
FIG. 4 is schematic flow diagram showing another embodiment of the invention particularly showing a manufacturing method using injection molding.

Relating to embodiments 1-1, 1-2 and 1-3, a manufacturing method by gas-assisted injection molding using thermoplastic plastic material is described in a further specific embodiment. FIG. 4 is a diagram explaining a manufacturing method for a hollow structural member by injection molding. Referring to FIG. 4, first, a molten resin 16 is poured from a nozzle 15 into a cavity 14 of a molding die 13 composed of a fixed die 11 and a movable die 12. The die 13 is structured so as to form one hollow part of a simple shape, or one hollow part communicating in a complicated shape, or a plurality of internally independent hollow parts separated by partition plates (partition walls) or the like in a cross or tee form. An amount of molten resin 16, insufficient for filling up the cavity 14 is poured into the cavity 14. In succession, from the same nozzle 15, a gas 17 and a functional substance 18 are poured in. In this case, by injecting the gas 17 while injecting the molten resin 16, the cavity 14 can be entirely filled with the molten resin 16. Or, after injecting the gas 17, additional molten resin 16 can be injected into the mold. The timing of injecting the functional substance into the inside of the hollow part is arbitrary. It is also possible to feed the functional substance 18 into the gas 17 used for forming the hollow part. Or, the gas 17 and the functional substance 18 can be fed at the same time. Moreover, the functional substance 18 can be injected before or after injection of the gas 17. The nozzle for injecting the molten resin 16, gas 17 or functional substance 18 may be arbitrarily disposed at plurality of positions, not limited to one position. The nozzle for injecting the molten resin 16, the nozzle for injecting the gas 17, and the nozzle for injecting the functional substance 18 may be either a single nozzle of several independent nozzles. Afterwards, the molten resin 16 having a hollow part 19 and functional means 20 formed on the inner surface of the hollow part 19 is cooled and solidified. Finally, a solidified structural member 21 having the hollow part 19 and the functional means 20 formed on the inner surface of the hollow part 19 is taken out of the die 13.

Embodiment 3

In the gas-assisted injection molding technique of embodiment 2, the following die composition may be employed as the means for forming a plurality of independent hollow parts. That is, together with gas assisting, in order to form intersecting partition walls in a form such as X shape and + shape, Y form, tee form, cruciform, plural partition plates or pins are incorporated in the movable die 12 so as to be free to move in and out. In this case, also the timing of injecting the functional substance 18 into the inside of the hollow part 19 is arbitrary. That is, it is also possible to feed the functional substance 18 in the form of a gas mixture as the gas 17 for forming the hollow part. Or, the gas 17 and the functional substance 18 can be injected at the same time. Moreover, the functional substance 18 can be injected before or after injection of the gas 17. Or, before forming the partition wall, by forming the functional means 20 preliminarily inside of the hollow part 18 and then composing the partition walls intersecting in cross form or tee form. If the hollow parts 18 are independent, the functional means 20 formed in these hollow parts 18 are mutually connected.

Embodiment 4

Figure 5:
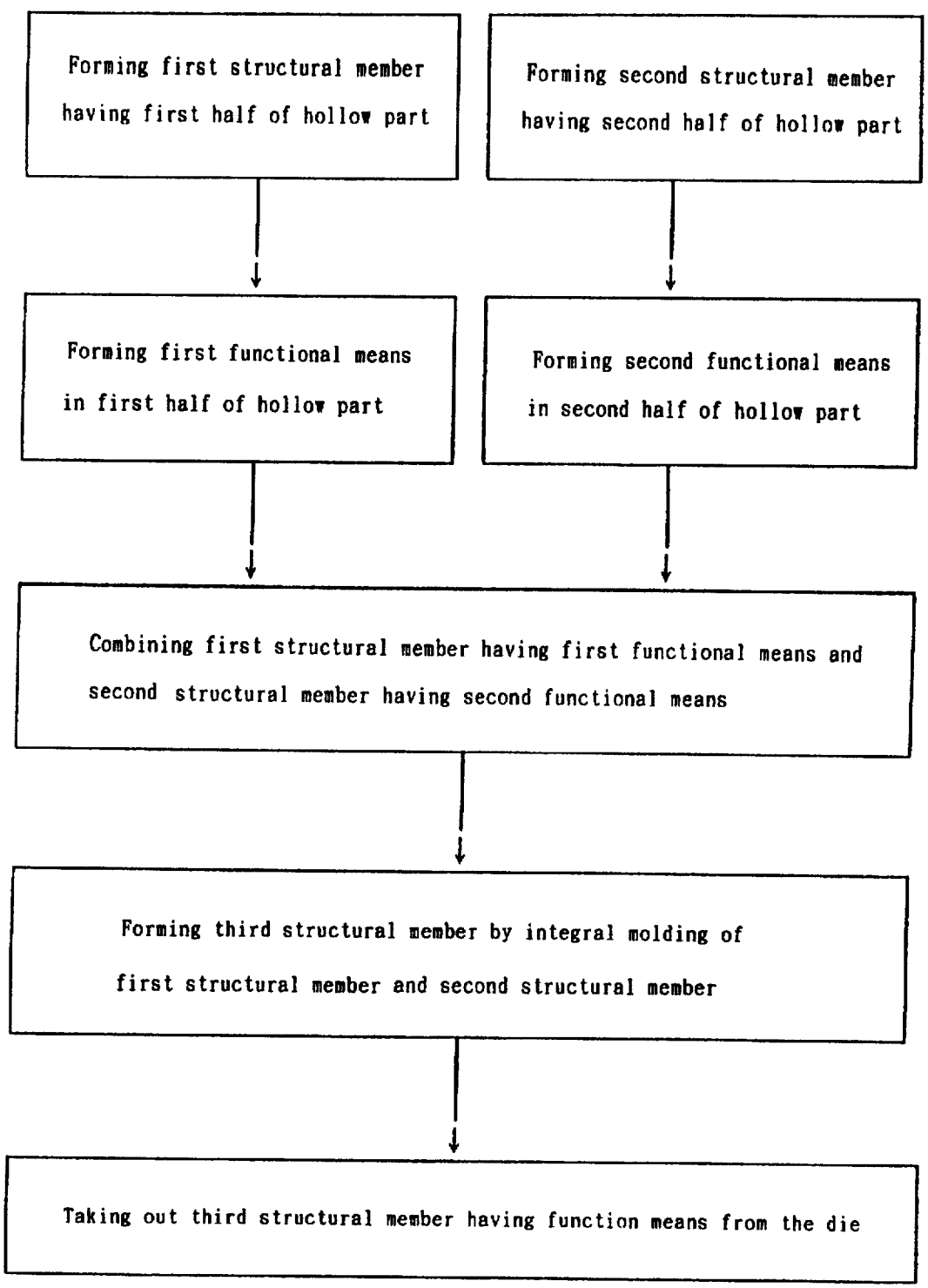
FIG. 5 is a process chart showing another embodiment of a manufacturing method for a hollow structural member of the invention.

FIG. 5 shows an outline of a manufacturing process of a further different embodiment of a manufacturing method of a hollow structural member of the invention. In FIG. 5, the method is characterized by:

(1) forming a first structural member having a first half for forming a portion of a hollow part, by using a first die having a first fixed die and a first movable die, (2) forming a second structural member having a second half for forming a portion of the hollow part, by using a second die having a second fixed die and a second movable die, (3) forming first functional means inside of the first half, (4) forming second functional means inside of the second half, (5) moving the second movable die to the first fixed die, thereby combining the first structural member having the first functional means and the second structural member having the second functional means so as to form the hollow part by the first half and second half, and forming the first structural member and second structural member into one body to as to form a third structural member, and (6) removing the third structural member, from the first fixed die and second movable die.

Embodiment 5

Relating to embodiment 4, a further specific embodiment is described below. In this forming method, primary molding and secondary molding are effected by one die. Moreover, between the primary molding step and secondary molding step, another step is inserted for forming the functional means. That is, when manufacturing an integral structure constructed by disposing a plurality of independent hollow parts inside by partition plates (partition walls) crossing in cross form or tee form, first, each half portion is injection molded in a primary molding by one molding die. In consequence, in order to dispose functional means inside of the hollow parts, functional means is disposed on the surface of the concave part and joining surface sides for forming the hollow parts of the individual half portions. The functional means is disposed on the surface of the hollow parts by any means, such as spraying, injecting, tampon printing or other transfer methods. The injection molding dies forming the half portions are combined by mutually sliding the mating or exposed surfaces together, and by performing secondary molding in the combined state, the half portions combined by the use of the resin material for secondary molding, into one body.

Figure 6A:
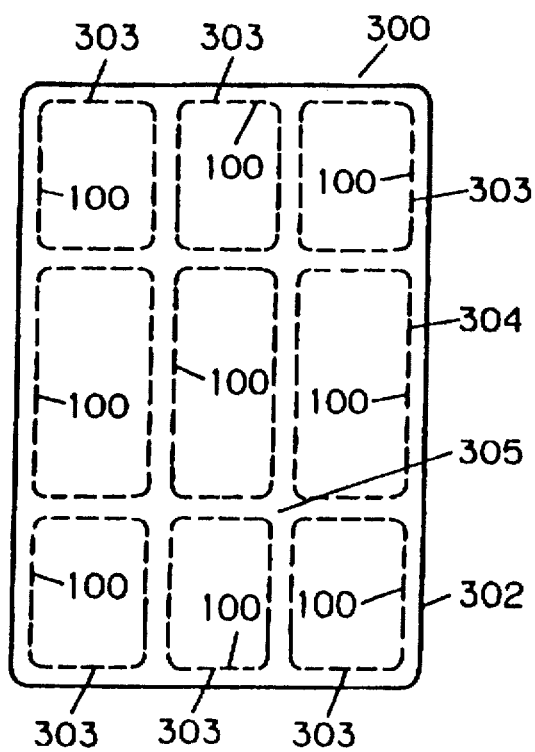
FIG. 6A is a plan view of a hollow structural plate manufactured by an embodiment of the invention.
Figure 6B:
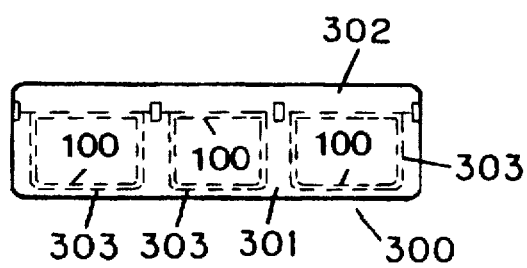
FIG. 6B is a cross-sectional view of the hollow structural plate shown in FIG. 6A.

This embodiment is further described below while referring to FIG. 6A to FIG. 6E. FIG. 6A is a plan view of a hollow structural member manufactured in accord with embodiment 5, and FIG. 6B is its front view. In FIGS. 6A and 6B, a hollow structural plate 300 is formed by coupling two hollow structural plates formed by primary molding a first half 301 and a second half 302 using a second resin member 400. Inside of the structural plate 300, a plurality of independent first hollow parts 303 and second hollow parts 304 are neatly arranged. These hollow parts 303, 304 are isolated from each other by the partition wall 305. Functional means 100 is disposed inside of each hollow part in a specific film or layer form.

Figure 6C:
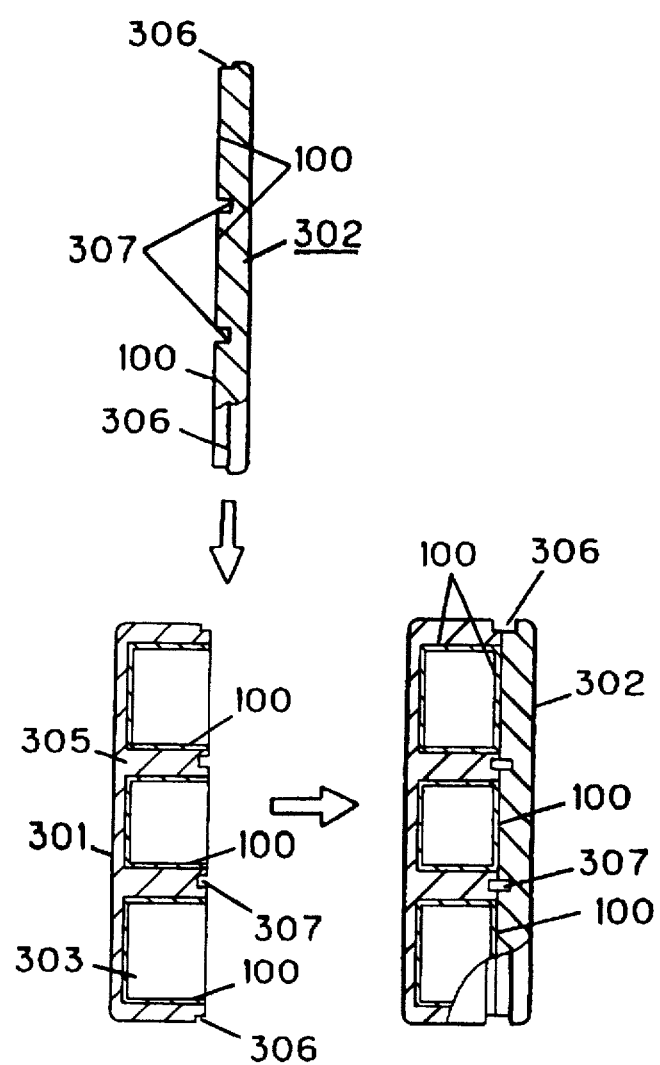
FIG. 6C is a cross-sectional view illustrating the process of forming the hollow structural plate shown in FIG. 6A.
Figure 6D:
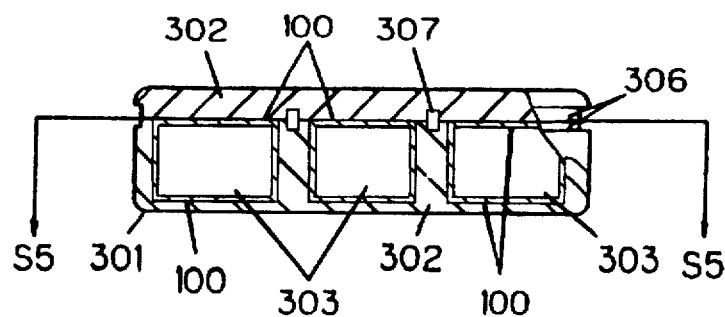
FIG. 6D is a cross-sectional view of the hollow structural plate manufactured in FIG. 6C.
Figure 6E:
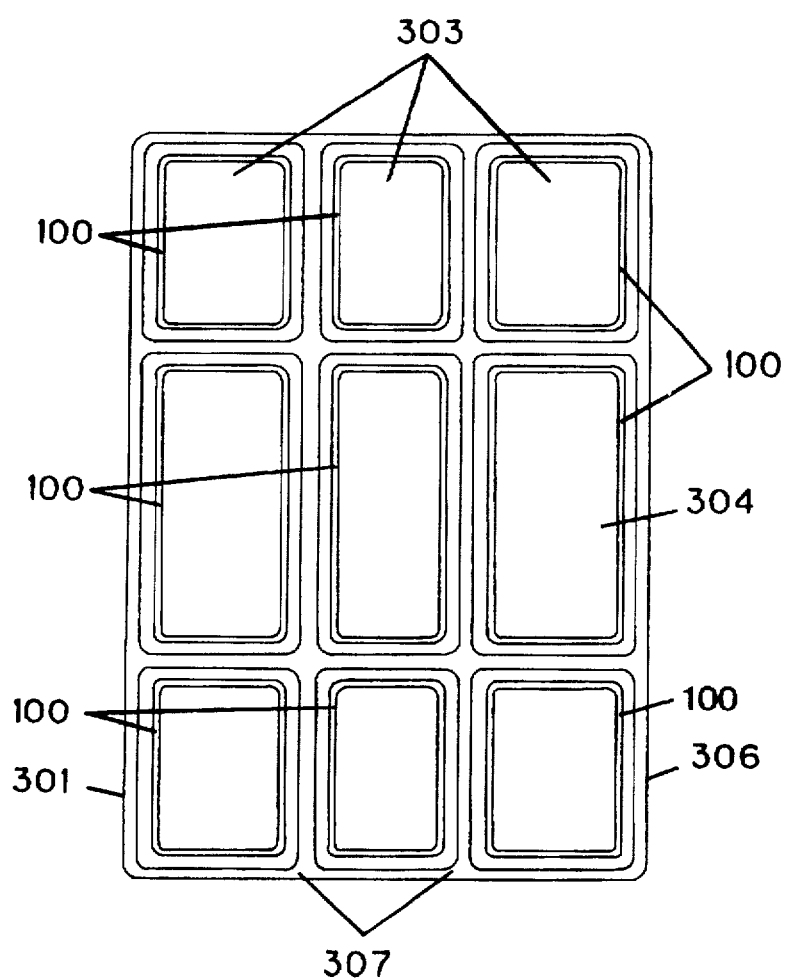
FIG. 6E is a plan view seen from the direction of section line S5—S5 shown in FIG. 6D.

FIG. 6C is a sectional view for explaining the molding process of the hollow structural member of the embodiment, FIG. 6D is a sectional view of a manufactured hollow structural member, and FIG. 6E is a plan view of the surface being cut along the section S5 shown in FIG. 6D. In FIGS. 6C, 6D and 6E, to begin with, the first half 301 having holes 303, 304 is formed by a first die composed of a first fixed die and a first movable die. As a result, the functional means 100 is disposed on the surface of the holes 303, 304. On the other hand, by using a second die composed a second fixed die and a second movable die, the second half 302 is formed. The functional means 100 is disposed in a specified area of the second half 302. Grooves 307 are formed in the end circumferences of the first half 301 and second half 302, and a stepped recess 306 is formed at the end of the partition wall 305. Then, in order that the groove 307 and stepped recess 306 may be matched, the second half 302 in the second movable die is combined with the first half 301 in the first fixed die. Secondary molding is done by injecting a resin member into the groove 307 and stepped recess 306 of the combined first half 301 and second half 302. Thus, the first half 301 and second half 302 are combined into one body. In this manner the, hollow structural member is manufactured with the plurality of the first hollow parts 303 and second hollow parts 304 mutually partitioned by the partition wall 305, and the functional means 100 disposed on the surface of these hollow parts 303, 304.

Embodiment 6

Figure 7:
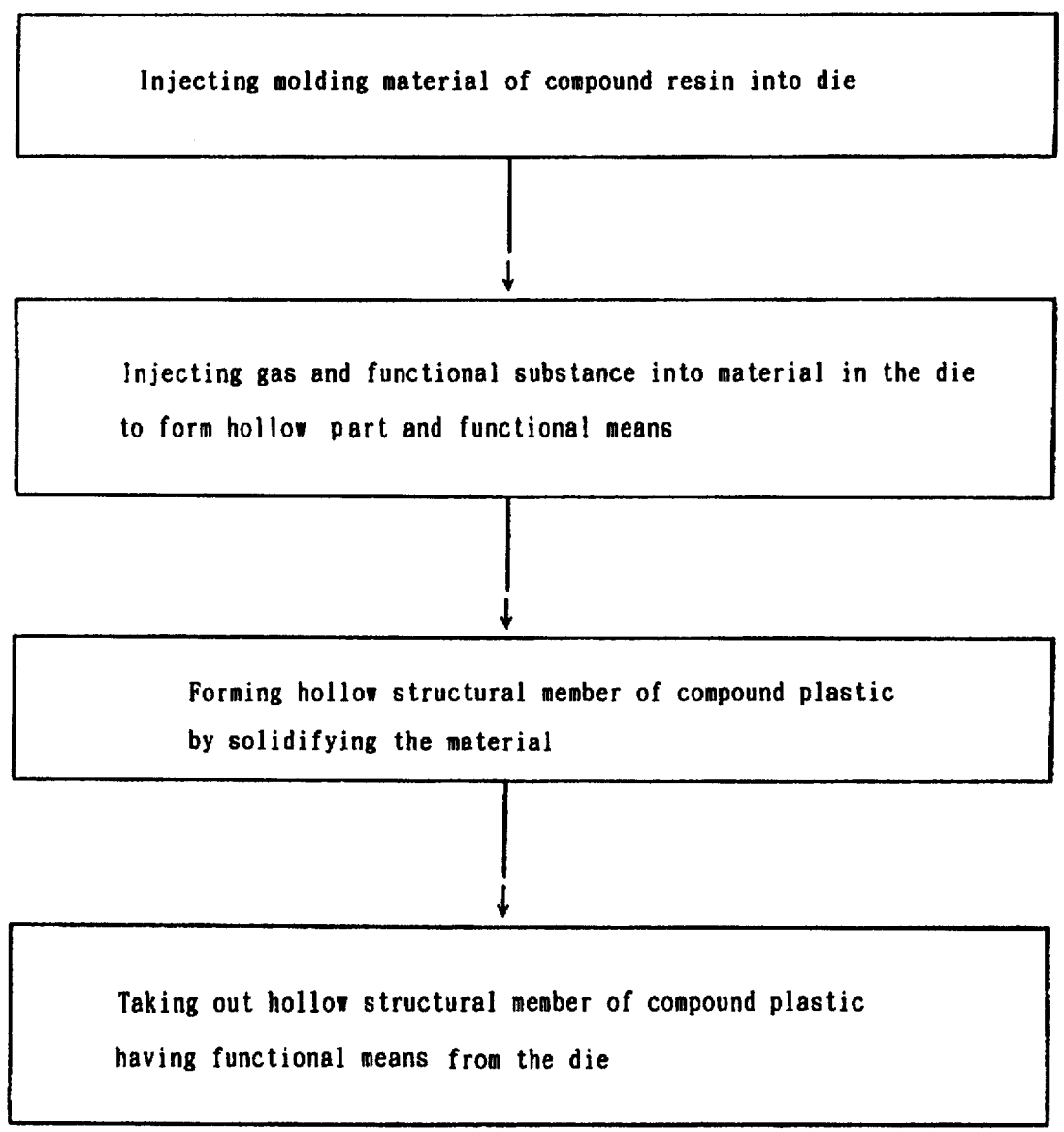
FIG. 7 is a process chart showing a different embodiment of a manufacturing method for a hollow structural member of the invention.

FIG. 7 is a diagram explaining a different manufacturing method of a hollow structural member of the invention, from compound plastics, by using compound resin containing a conductive filler or a magnetic filler. In FIG. 7, the process is characterized by:

(1) injecting a material of compound resin containing conductive filler or magnetic filler into a cavity of a die, (2) injecting a functional substance and a gas before the material is solidified, thereby forming a hollow part in the material, and simultaneously forming functional means on the inside surface of the hollow part, (3) solidifying the material forming the hollow part, and (4) removing the solidified structural member formed with the functional means in the hollow part, from the die.

Embodiment 7

Figure 8:
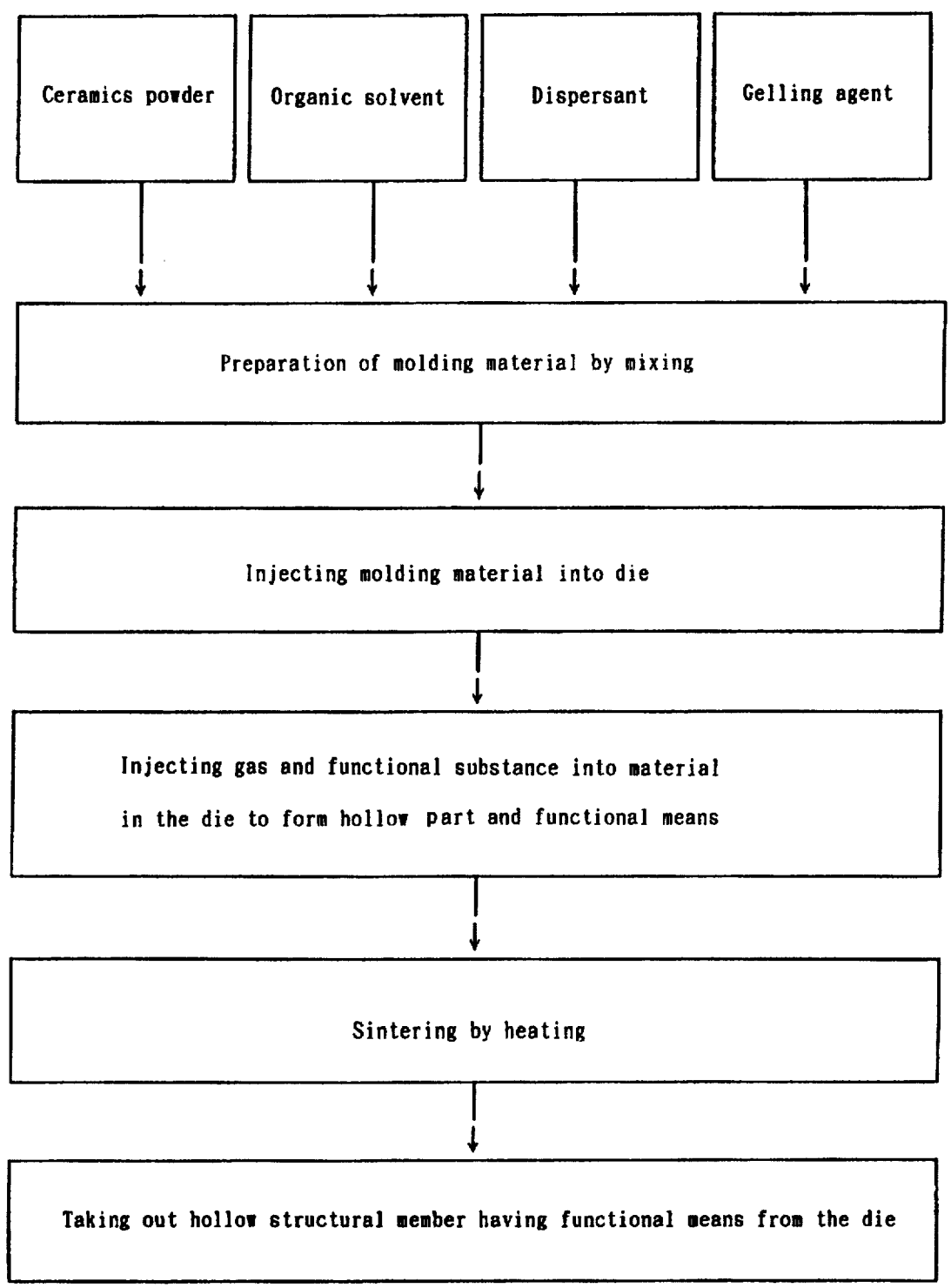
FIG. 8 is a process chart showing yet another embodiment of a manufacturing method for a hollow structural member of the invention.

An embodiment using ceramics as a structural member is described below. FIG. 8 shows a manufacturing process of a hollow structural member according to a further different embodiment of the invention, which comprises the steps of:

(1) mixing ceramic powder, silicon nitrite, alumina, and yittria, an organic solvent such as alcohol, paraffin or hydrocarbon, a dispersant such as polyethylene alkyl ether phosphate or polyethylene glycol alkyl ether, and a gelling agent of fatty acid containing hydroxy group, (2) pouring the mixture into a die, (3) injecting a mixture of ferrite powder and nitrogen gas into the mixture in the die, thereby forming a hollow part, and simultaneously forming a functional film on the surface of the hollow part, (4) heating to about 500 deg. C. to solidify the material, and (5) sintering, thereby obtaining a hollow structural member having a magnetic layer in the hollow part.

In the invention, aside from the gas-assisted injection molding method or the method of performing primary molding and secondary molding by using one die explained in the foregoing embodiments, any arbitrary hollow part forming method may be employed.

The functional means, is not particularly defined, but, for example, a magnetic member, a conductive member, an antibacterial member, or stiff member may be formed.

The magnetic member is not particularly defined, but, for example, soft magnetic material such as iron oxide and ferrite, stiff magnetic material such as barium ferrite and strontium ferrite, magnetic metal such as iron, silicon and nickel, and a magnetic alloy such as iron-nickel, iron-silicon, iron-cobalt, and iron-aluminum can be used. The material of such magnetic member is used in powder or fiber form, and by injecting a gas containing such magnetic powder into the hollow part, a magnetic layer is disposed on the inside of the hollow part. Or by spraying a paint formed by mixing the magnetic powder with binder, solvent or other resin member, a magnetic coating film is formed. The magnetic layer or magnetic member of such magnetic layer absorbs electromagnetic waves from outside, and works to attenuate or extinguish the electromagnetic waves.

The conductive member is not particularly defined, but, for example, silver, copper, brass, iron, zinc, aluminum, nickel, stainless steel, or carbon may be used. The material of such conductive member is used in powder or fiber form, and by injecting a gas containing such conductive powder into the hollow part, a conductive layer is disposed on the inside of the hollow part. Or by spraying a paint formed by mixing the conductive powder with a binder, solvent or other resin member, a conductive coating film is disposed on the inside of the hollow part. The conductive layer or conductive member of such conductive layer works to reflect the electromagnetic waves from outside.

The shape of the material of the magnetic member or the conductive member is not particularly defined, but, for example, size and shape suited to mixing with high pressure gas, or size and shape suited to containing conductive paint may be employed. The thickness of the layer of the functional means disposed on the surface of the hollow part is not particularly defined, but it may be, for example, 1 micrometer or more. Especially when used as the means for shielding the electromagnetic waves, the thickness of the conductive member is desired to be about 1 micrometer or more, and the thickness of the conductive member is preferred to be about 10 micrometers or more.

The particle size of the powder is not particularly defined, but, for example, it may be about 0.1 micrometers to about 100 micrometers, and especially about 0.5 micrometers to about 20 micrometers may be preferred. The diameter of fiber is not particularly defined, but, for example, about 1 micrometer to 100 micrometers may be preferred. The length of fiber is not particularly defined, but, for example, about 0.5 millimeters to about 10 millimeters may be preferred.

As the antibacterial member, antibacterial zeolite, chitosan, tannin, or tropylone may be used. The antibacterial zeolite contains bactericidal substance such as silver copper and zinc in its fine pores, and is effective to cut off the survival environments for the depositing bacteria. When added to plastics such as polypropylene, it is effective by adding by several percent. Chitosan is contained in the shells of crabs and shrimps, and possesses antibacterial and antifungal activities. When added to plastics, it is effective at about 0.3% to about 3%. Powder with particle size of about 5 micrometers or less is used. Tannin is contained in mugwort, and has an antiallergic or analgesic effect. Chlorophyll is contained in plants, and has a bactericidal effect. A microcapsule of a particle size of about 0.5 micrometers to about 20 micrometers containing extract of mugwort is used. Tropylone is contained in hinoki-cypress, and has a preservative effect to prevent bacteria or fungi. A microcapsule containing tropylone is used.

Moreover, the conductive paint may be mixed with any solvent such as alcohol, toluene, thinner and acetone, or with PVA (polyvinyl alcohol), or the like. The conductive paint may also contain a specified amount of desired resin member, such as epoxy resin, acrylic resin, vinyl chloride resin, ABS resin, PS resin, polyamide resin, polycarbonate resin, styrene resin, or other thermoplastic resin.

In gas-assisted injection molding of the hollow structural member, the gas to be blown for forming the hollow part is not particularly defined, but, for example, nitrogen, carbon dioxide, air or other inert gas may be used. At the same time, a substance having a boiling point below the ambient temperature or a substance liquefied at high pressure may be also used.

The material of the hollow structural member is not particularly defined, but, for example, thermoplastic plastic, thermosetting plastic, rubber, inorganic matter, ceramics, and compound plastic containing filler may be used. For example, as the thermoplastic plastic, polypropylene, polystyrene, ABS resin, polyethylene, acrylic resin, and polyethylene terephthalate may be used. Examples of thermosetting plastics include phenol resin, epoxy resin, melamine resin, and polyester fiber. As for rubber, silicone rubber, butadiene rubber, butyl rubber, fluorine, copolymerization rubber or others may be used. As for ceramics, False Stellite, alumina, silicon nitrite or others may be used, and as the material, mixtures of ceramics powder with solvent, organic binder, surfactant, thickener and others may be used. As for the solvent, water, polyvinyl alcohol, alcohol, toluene or others may be used. The compound plastic containing filler may include plastics mixed with powder of silica, alumina, calcium carbonate, glass fiber, balloon (hollow matter made of glass, metal, ceramics, etc.) or others. In particular, the compound plastic containing balloon is effective for reducing the weight. Biodegradable plastics include, for example, denatured protein members such as gluten, kneaded member of paper and denatured protein, agar member, member of potato starch kneaded in water, natural high polymer novamont (tradename Materbie of Nippon Gosei Kagaku), microorganism producing polyester system ICI (tradename Biopole of ICI Japan), chemically synthesized aliphatic polyester (tradename Vionolet of Showa Kobunshi) and others.

By the above manufacturing method, molded products having excellent surface properties and superior appearance can be obtained, and at the same time the molding cycle is short, and hence the hollow structural member having a functional property can be manufactured easily and at low cost. In particular, excellent effects are obtained when manufacturing a structural member having a plurality of hollow parts, and forming functional means on the surface of the hollow parts. Besides, the characteristics of the resin member used in injection molding are not altered. For example, without changing the molding properties of the resin member, arbitrary structures and curved shapes can be constructed depending on the diversity of design and purposes of use. The functional means can be disposed only in a necessary region of the structural member. Moreover, since the hollow part and functional means can be formed simultaneously, the material cost or manufacturing processes can be reduced.

Embodiment 8

Figure 9:
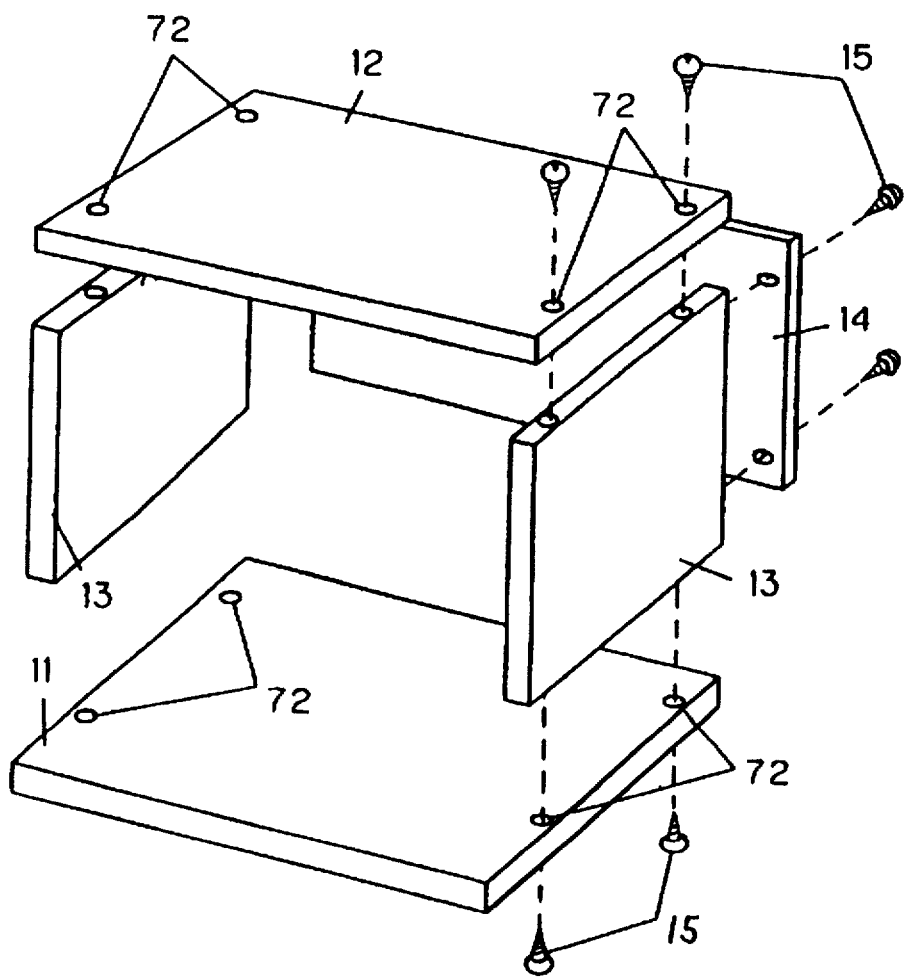
FIG. 9 is a perspective exploded view before assembly of a television receiver stand using a hollow structural member manufactured by an embodiment of the invention.

A manufacturing method for a hollow structural member to be used to make a set stand for mounting an electronic appliances such as television receiver and shielding the appliance from electromagnetic waves (hereinafter called TV stand), is described below. FIG. 9 is a perspective exploded view before assembly of the TV stand using a hollow structural member obtained from the manufacturing method in an embodiment of the invention. In FIG. 9, the TV stand is composed of five hollow structural members, that is, bottom plate 11, top plate 12, side plates 13, and rear plate 14. These hollow structural members are assembled and mutually coupled by coupling screws 15. Inside the TV stand, the video tape recorder (VTR), BS tuner, CS tuner and other electronic appliances (not shown) are accommodated. Electromagnetic waves from outside are shielded by this TV stand. At the four corners of the hollow structural member composing the bottom plate 11, top plate 12 and rear plate 14, stepped penetration holes 72 for positioning the members are disposed. The plurality of hollow parts forming the structural members are formed at positions not affecting the strength, e.g. close to the stepped penetration holes 72.

FIGS. 10 to 14 show various embodiments of the hollow structural member of the invention. The hollow structural members of the illustrated embodiments are manufactured by gas-assisted injection molding, or integral molding by primary molding and secondary molding. The hollow structural member manufactured by integral molding has one hollow part with a plurality of hollow parts inside, and an electromagnetic wave shielding member is formed inside of the hollow part in a film or layer form.

Embodiment 8-1

Figure 10A:
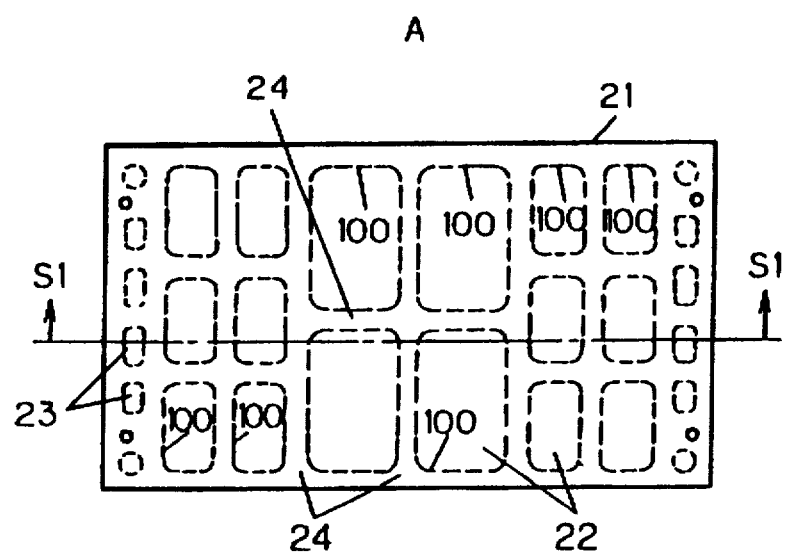
FIG. 10A is a plan view of a hollow structural member obtained by an embodiment of the invention.
Figure 10B:
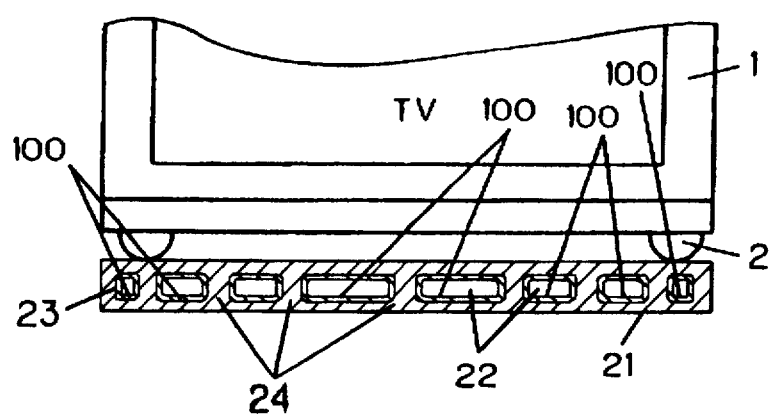
FIG. 10B is a sectional view from the direction of section line S1—S1 shown in FIG. 10A.

FIG. 10A and FIG. 10B show one embodiment of the invention. FIG. 10A is a plan view of a hollow structural member composing the top plate of the TV stand, and FIG. 10B is a sectional view seen from the direction of line S1—S1 of FIG. 10A. The top plate 21 is intended to reduce the weight and functions to cut off electromagnetic waves. In the portion requiring high strength, that is, in the portion located below the base part 2 of the television receiver 1 and receiving its load, a hollow part 23 having a small volume is formed, and in the portion not directly provided with load, a hollow part 22 having a large volume is formed, and the small hollow part 22 and large hollow part 23 are disposed in specific shapes by mutually crossing partition walls 24. In this embodiment, by symmetrically disposing three types of hollow parts differing in size, the weight of the top plate 21 is reduced. At the inner side of the small hollow part 22 and large hollow part 23, conductive members 100 having an electromagnetic wave shielding function are displayed in a thin film or layer form. The means for disposing the conductive members 100 can be formed in one of the foregoing embodiments 1 to 6. By keeping the total volume of the hollow parts in a range of 20 to 90% of the volume of the outer circumference of the top plate 21, the resin material is saved, and the cost is lowered. The rate of total occupancy of the hollow parts may be determined depending on the purpose of use, required strength and resin material for constructing the hollow structural member. To form a plurality of independent hollow parts, as shown in FIG. 10A, partition walls are formed in a cross form or tee form, but the partition walls are not limited to cross form or tee form, partition walls may be constructed in various forms.

Embodiment 8-2

Figure 11A:
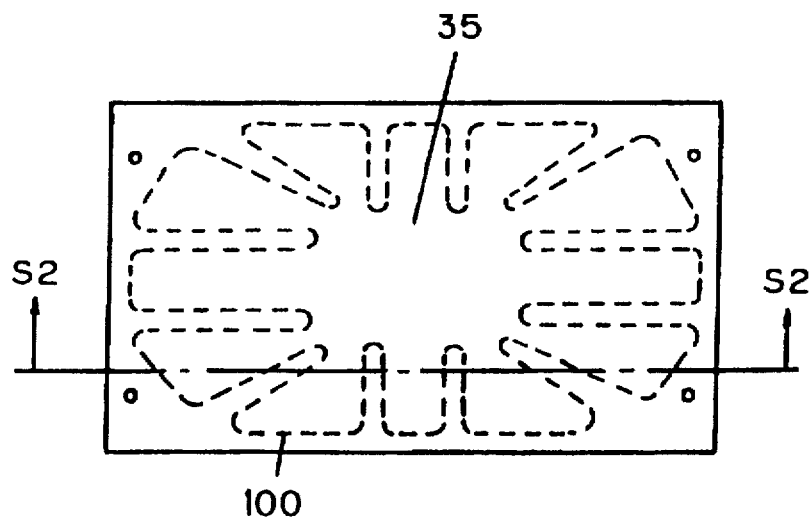
FIG. 11A is a plan view of a hollow structural member obtained by another embodiment of the invention.
Figure 11B:
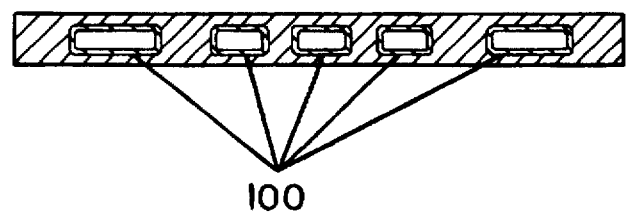
FIG. 11B is a sectional view from the direction of section line S2—S2 shown in FIG. 11A.

FIGS. 11A and 11B show another embodiment of the invention, and FIG. 11A is a plan view of a hollow structural member for making the top plate, bottom plate or side plates of the TV stand. FIG. 11B is a sectional view seen from direction of line S2—S2 of FIG. 11A. The hollow structural member shown in FIGS. 11A and 11B is reduced in weight, and has a radial hollow part 35. In the structural member having a radial hollow part, when the load is applied almost uniformly on the entire surface of the structural member, the stress is uniformly dispersed, and as a result the molded piece is free from warp or deflection. Electromagnetic wave shielding means 100 is disposed at specified position on the inner side of the hollow part 35.

Embodiment 8-3

Figure 12A:
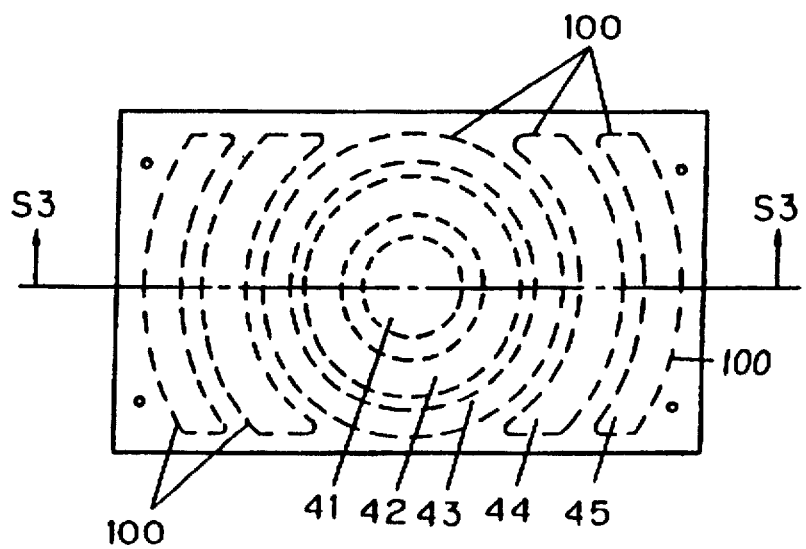
FIG. 12A is a plan view of a hollow structural member obtained by a different embodiment of the invention.
Figure 12B:
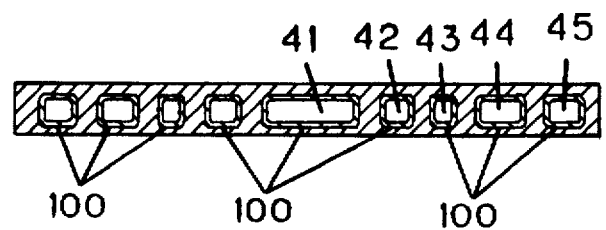
FIG. 12B is a sectional view from the direction of section line S3—S3 shown in FIG. 12A.

FIGS. 12A and 12B show other embodiment of the invention, and FIG. 12A is a plan view of a hollow structural member for making the top plate, bottom plate or side plates of the TV stand. FIG. 12B is a sectional view seen from direction of line S3—S3 of FIG. 12A. The hollow structural member shown in FIGS. 12A and 12B is reduced in weight, and has concentric hollow parts. The concentric hollow parts consist of, concentrically from the center to the outer circumference, a circular hollow part 41, annular hollow parts 42, 43, and arcuate hollow parts 44, 45. In the structural member having concentric hollow parts, when the load is applied to the center of the structural member, the stress is uniformly dispersed; so that the molded piece is free from warp or deflection. Electromagnetic wave shielding means 100 is disposed at specified positions at each inner side of the circular hollow part 41, annular hollow parts 42, 43, and arcuate hollow parts 44, 45.

Embodiment 8-4

Figure 13A:
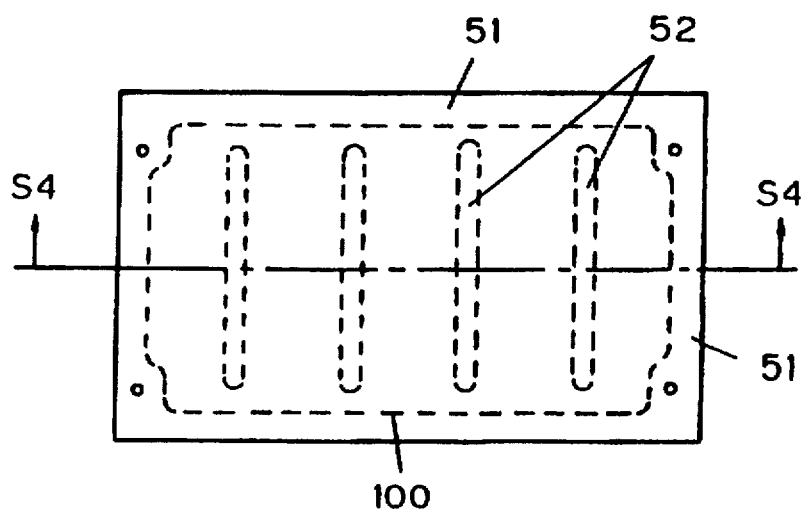
FIG. 13A is a plan view of a hollow structural member obtained by a further different embodiment of the invention.
Figure 13B:
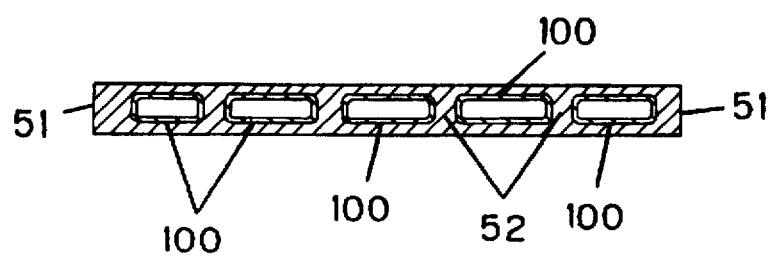
FIG. 13B is a sectional view from the direction of section line S4—S4 shown in FIG. 13A.

FIGS. 13A and 13B show other embodiment of the invention, and FIG. 13A is a plan view of a hollow structural member for making the top plate, bottom plate or side plates of the TV stand, and FIG. 13B is a sectional view seen from direction of line S4—S4 of FIG. 13A. The hollow structural member shown in FIGS. 13A and 13B is reduced in weight, and has four reinforcing ribs. The four reinforcing ribs 52 disposed in the center are constructed so that the peripheral side wall thickness 51 may be greater than the wall thickness of the reinforcing ribs 52 when a load is applied to the peripheral edge of the structural member. The reinforcing ribs 52 prevent warp, deflection or shrinkage of the molded piece. At the inner side of the hollow part, electromagnetic wave shielding means 100 is disposed at a specified position.

Embodiment 8-5

Figure 14A:
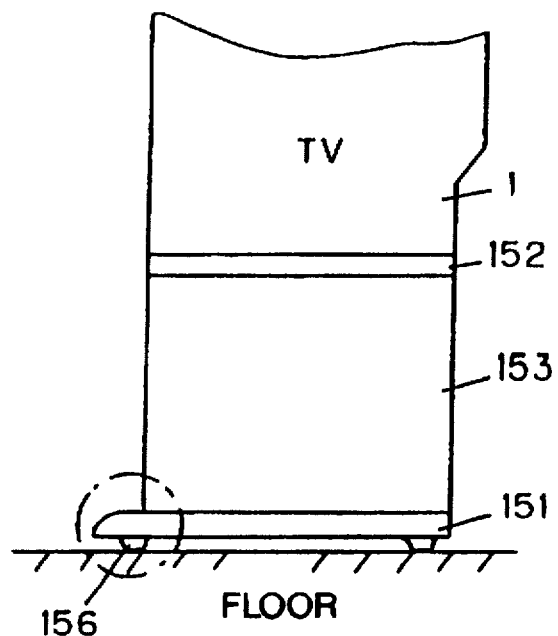
FIG. 14A is a plan view of a hollow structural member obtained by a still different embodiment of the invention.
Figure 14B:
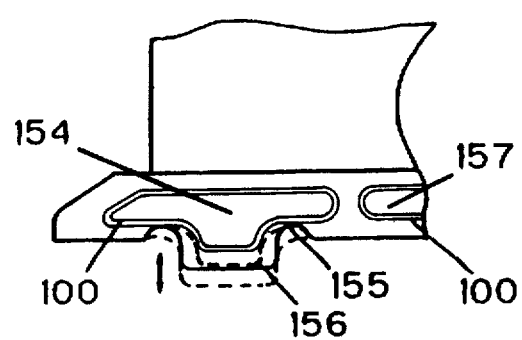
FIG. 14B is a magnified sectional view of a base part of FIG. 14A.
Figure 16:
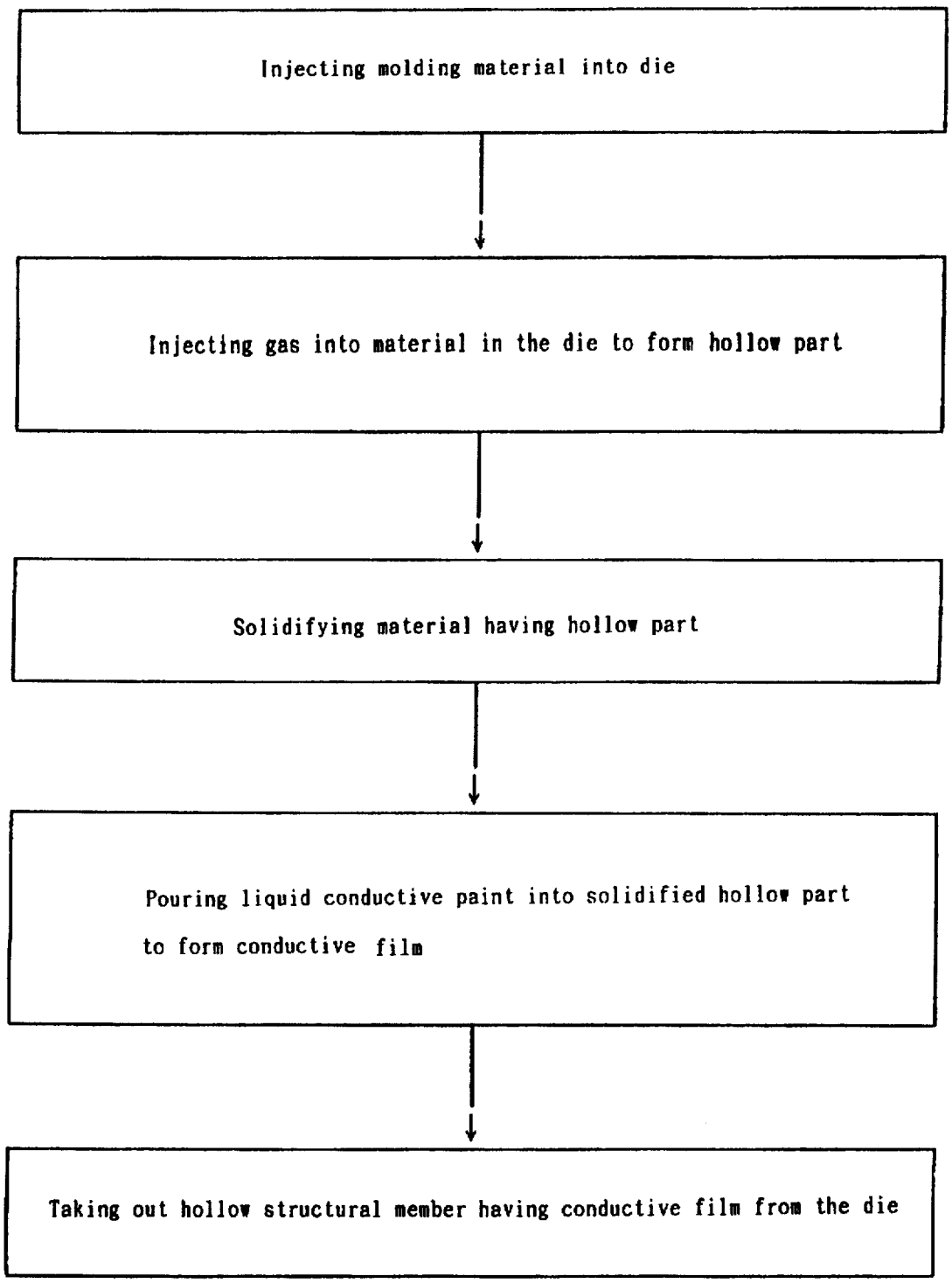
FIG. 16 is a process chart showing a conventional manufacturing method for a hollow structural member.

FIGS. 14A and 14B show a different embodiment of the invention. FIG. 14A is a side view of a TV stand holding the television receiver, and FIG. 14B is a magnified sectional view of base part of FIG. 14A. At four specified positions a hollow structural member comprising a bottom plate 151 of the TV stand, an elastic base part 156 for absorbing vibration from outside is disposed. The elastic base part 156 has a hollow part 154 of a nearly T-shape section at four corners of the bottom plate 151. The elastic base part 156 has arcuate thin wall parts 155 formed symmetrically in order to have functional elasticity of a compression spring. Vibration is absorbed or alleviated, by deflecting the base part in the arrow direction from the broken line position to the solid line position. On the inner surface of the hollow parts 154, 157, electromagnetic wave shielding means 100 is disposed at specific positions.

Thus, according to embodiments 8-1 to 8-5, the TV stand having excellent electromagnetic wave shielding means and excellent mechanical strength against outside loads is obtained.

Besides, by setting the size and shape of the hollow parts as specified, the desired mechanical strength can be obtained by varying the value in every position of the same structural member.

Because of integral molding, joining or assembling of separate parts is not needed.

In the foregoing embodiments the hollow structural members for constructing the TV stand are described, but the application is not limited to the TV stand only. For example, the invention may be applied to the box for accommodating electronic components, devices or other electronic appliances.

What is claimed:

1. A method of manufacturing a hollow structural member comprising the steps of:

(a) pouring a molding material into a die, (b) injecting gas into the material to form a hollow part in the material, (c) injecting a substance having a function into the hollow part of the material to deposit a functional means on a surface inside the hollow part, before solidifying the molding material having the hollow part, (d) solidifying the material having the hollow part and the functional means deposited inside of the hollow part to form a structural member, and (e) removing the solidified structural member containing the functional means deposited on the surface inside of the hollow part from the die.

2. A manufacturing method according to claim 1, wherein at steps (b) and (c), by injecting the gas and the substance having the function separately at the same time, the hollow part is formed inside the material, and the functional means is formed inside of the hollow part simultaneously.

3. A method of manufacturing a hollow structural member comprising the steps of:

(a) pouring a molding material into a die, (b) injecting gas into the material to form a hollow part in the material, (c) injecting a substance having a function into the hollow part of the material to deposit a functional means having a function on a surface inside the hollow part, before solidifying the molding material having the hollow part, the function being at least one selected from the group consisting of conductivity, magnetic property, and antibacterial property, the functional means being at least one selected from the group consisting of conductive member, magnetic member, and antibacterial member, (d) solidifying the material having the hollow part and the functional means to form a structural member, and (e) removing the solidified structural member containing the functional means deposited on the surface inside of the hollow part from the die.

4. A manufacturing method according to claims 1 or 3, wherein the substance having the function is at least one of powder and fiber.

5. A manufacturing method according to claims 1 or 3, wherein the substance having the function is a paint.

6. A manufacturing method according to claims 1 or 3, wherein the structural member is composed of an electrical insulating substance.

7. A manufacturing method according to claims 1 or 3, wherein the structural member is a compound plastic containing at least one of magnetic filler and conductive filler.

8. A manufacturing method according to claims 1 or 3, wherein the hollow part is composed of a plurality of holes.

9. A manufacturing method according to claim 8, wherein the plurality of holes are composes of at least one of independent holes and continuous holes.

10. A manufacturing method according to claim 1, wherein the structural member contains a base part having one of independent holes and continuous holes.

11. A manufacturing method according to claims 1 or 3, wherein the structural member is composed of a material selected from the group consisting of thermoplastic plastic, thermosetting plastic, rubber, inorganic material, ceramics, compound plastic containing filler, and biodegradable plastic.

12. A manufacturing method according to claims 1 or 3, wherein the molding material is composed of a thermoplastic resin, and the molding material is melted by heating.

13. A manufacturing method according to claims 1 or 3, wherein the hollow structural member is formed by injection molding method.

14. A manufacturing method according to claims 1 or 3, wherein at steps (b) and (c), by injecting a mixture of the gas and the substance having the function, the hollow part is formed inside the material, and the functional means is formed inside of the hollow part simultaneously.

15. A manufacturing method according to claims 1 or 3, wherein the functional means is at least one selected from the group consisting of thin film, layer, and multiple layers.

16. A method of manufacturing a hollow structural member comprising the steps of:

(a) pouring a molding material into a die, (b) injecting a mixture of a gas and a substance having a function into the material to form a hollow part in the material, and to deposit a functional means on a surface inside of the hollow part simultaneously, (c) solidifying the material containing the functional means formed inside of the hollow part to form a structural member, and (d) removing the solidified structural member containing the functional means deposited inside of the hollow part, from the die.

17. A manufacturing method according to claim 16, wherein the structural member is composed of a material selected from the group consisting of thermoplastic, thermosetting plastic, rubber, inorganic matter, ceramics, compound plastic containing filler, and biodegradable plastic.

18. A method of manufacturing a hollow structural member comprising the steps of:

(a) pouring a molding material into a die, (b) injecting a mixture of a gas and a substance having a function into the material to form a hollow part in the material, and to form a functional means inside of the hollow part simultaneously, (c) solidifying the material containing the functional means formed inside of the hollow part to form a structural member, and (d) removing the solidified structural member containing the functional means formed inside of the hollow part from the die, wherein the functional means is at least one selected from the group consisting of conductive member, magnetic member, and antibacterial member.

19. A method of manufacturing a hollow structural member comprising the steps of:

(a) pouring a molding material into a die, (b) injecting a mixture of a gas and a substance having a function into the material to form a hollow part in the material, and to form a functional means inside of the hollow part simultaneously, (c) solidifying the material containing the functional means formed inside of the hollow part to form a structural member, and (d) removing the solidified structural member containing the functional means formed inside of the hollow part from the die, wherein the substance having the function is at least one of powder and fiber.

20. A method of manufacturing a hollow structural member comprising the steps of:

(a) pouring a molding material into a die, (b) injecting a mixture of a gas and a paint into the material to form a hollow part in the material, and to form a functional means inside of the hollow part simultaneously, (c) solidifying the material containing the functional means formed inside of the hollow part to form a structural member, and (d) removing the solidified structural member containing the functional means formed inside of the hollow part from the die, wherein the substance having the function is a paint.

21. A manufacturing method according to claim 16, wherein the hollow part is composed of a plurality of holes.

22. A method of manufacturing a hollow structural member comprising the steps of:

(a) pouring a molding material into a die, (b) injecting gas into the material to form a hollow part having a plurality of holes in the material, (c) injecting a substance having a function into the plurality of holes of the material to deposit a functional means on a surface inside the plurality of holes, before solidifying the molding material having the plurality of holes, (d) solidifying the material having the plurality of holes and the functional means deposited inside of the plurality of holes to form a structural member, and (e) removing the solidified structural member containing the functional means deposited inside of the plurality of holes from the die.

23. A manufacturing method according to claim 22, wherein the plurality of holes are formed as being mutually isolated by a plurality of partition walls in at least one form selected from the group consisting of cross form, Y form and tee form.

24. A manufacturing method according to claim 22, wherein the plurality of holes are mutually isolated by concentric partition walls.

25. A manufacturing method according to claim 22, wherein the plurality of holes are mutually isolated by radial partition walls.

26. A manufacturing method according to claim 22, wherein the hollow structural member is molded by injection molding method.

27. A method of manufacturing a hollow structural member comprising the steps of:

(a) pouring a molding material into a die, (b) injecting gas into the material to form a hollow part having a plurality of holes in the material, (c) injecting a substance having a function into the plurality of holes of the material to deposit a functional means on a surface inside the plurality of holes, before solidifying the molding material having the plurality of holes, the substance being at least one selected from the group consisting of conductive member, magnetic member, and antibacterial member, (d) solidifying the material having the plurality of holes and the functional means deposited inside of the plurality of holes to form a structural member, and (e) removing the solidified structural member containing the functional means deposited inside of the plurality of holes from the die.

28. A method of manufacturing a hollow structural member comprising the steps of:

(a) pouring a molding material into a die, (b) injecting gas into the material to form a hollow part in the material, (c) injecting a magnetic substance into the hollow part of the material to form a magnetic member inside the hollow part, (d) solidifying the material having the hollow part to form a structural member, and (e) removing the solidified structural member containing the magnetic member formed inside of the hollow part from the die, wherein before the material is solidified, the gas is injected to form the hollow part in the material and the magnetic substance is injected to form the magnetic member inside of the hollow part.

29. A manufacturing method according to claim 28, wherein the hollow structural member is formed by injection molding method.

30. A method of manufacturing a hollow structural member comprising the steps of:

(a) pouring a molding material into a die, (b) injecting gas into the material to form a hollow part in the material, (c) injecting a magnetic substance into the hollow part of the material to form a magnetic member inside the hollow part, (d) solidifying the material having the hollow part to form a structural member, and (e) removing the solidified structural member containing the magnetic member formed inside of the hollow part from the die, wherein at steps (b) and (c), by injecting a mixture of the gas and the magnetic substance, the hollow part is formed inside the material, and the magnetic member is formed inside of the hollow part simultaneously.

31. A manufacturing method according to claims 28 or 30, wherein the magnetic substance is at least one selected from the group consisting of ferrite, magnetic metal and magnetic alloy.

32. A method of manufacturing a hollow structural member comprising the steps of:

(a) pouring a molding material into a die, (b) injecting gas into the material to form a hollow part in the material, (c) injecting a conductive substance into the hollow part of the material to form a conductive member inside the hollow part, (d) solidifying the material having the hollow part to form a structural member, and (e) removing the solidified structural member containing the conductive member formed inside of the hollow part from the die, wherein before the material is solidified, the gas is injected to form the hollow part in the material and the conductive substance is injected to form the conductive member inside of the hollow part.

33. A manufacturing method according to claim 32, wherein the hollow structural member is formed by injection molding method.

34. A method of manufacturing a hollow structural member comprising the steps of:

(a) pouring a molding material into a die, (b) injecting gas into the material to form a hollow part in the material, (c) injecting a conductive substance into the hollow part of the material to form a conductive member inside the hollow part, (d) solidifying the material having the hollow part to form a structural member, and (e) removing the solidified structural member containing the conductive member formed inside of the hollow part from the die, wherein at steps (b) and (c), by injecting a mixture of the gas and the conductive substance, the hollow part is formed inside the material, and the conductive member is formed inside of the hollow part simultaneously.

35. A manufacturing method according to claims 32 or 34, wherein the conductive substance is composed of at least one selected from the group consisting of silver, copper, brass, iron, zinc, aluminum, nickel, stainless steel, and carbon.

36. A manufacturing method according to claim 34, wherein the conductive substance is a paint.

37. A manufacturing method according to claim 1, 8 or 22, wherein at step (c), the substance having the function is injected into the hollow part of the molding material in a spraying state.

38. A manufacturing method according to claim 16, wherein at step (b), the mixture is injected into the hollow part of the molding material in a spraying state.

* * * * *

UNITED STATES PATENT AND TRADE MARK OFFICE
CERTIFICATE OF CORRECTION

PATENT NO.   : 5,753,174
DATED        : May 19, 1998
INVENTOR(S)  : Shimizu et al.

It is certified that error appears in the above-identified patent and that said Letters Patent is hereby corrected as shown below:

Column 13, line 7, delete "composes" and insert --composed--.

Column 13, line 11, delete "one of independent holes and continuos holes" and insert --an elastic function at its outside--.

Column 13, line 44, delete the comma after the word "part".

Column 16, line 47, delete "34" and insert --32--.

Column 16, line 49, delete "8" and insert --3--.

Signed and Sealed this

Thirty-first Day of August, 1999

Attest:

Q. TODD DICKINSON

*Attesting Officer*          *Acting Commissioner of Patents and Trademarks*